Oct. 30, 1923. Re. 15,712

D. HIRSCH

IDENTIFICATION MEANS FOR UMBRELLAS, PARASOLS, ETC

Original Filed May 11, 1921

INVENTOR
D. Hirsch

BY Sigmund Stern
ATTORNEY

Reissued Oct. 30, 1923. Re. 15,712

UNITED STATES PATENT OFFICE.

DANIEL HIRSCH, OF NEW YORK, N. Y.

IDENTIFICATION MEANS FOR UMBRELLAS, PARASOLS, ETC.

Original No. 1,411,096, dated March 28, 1922, Serial No. 468,563, filed May 11, 1921. Application for reissue filed April 4, 1923. Serial No. 629,939.

*To all whom it may concern:*

Be it known that I, DANIEL HIRSCH, a citizen of the United States, residing at the city of New York, in the county of New York and State of New York, have invented certain new and useful Improvements in Identification Means for Umbrellas, Parasols, Etc., of which the following is a specification.

This invention has relation to certain new and useful improvements in identification means for umbrellas, parasols and the like and has for its primary object the provision of a simple form of identification means which may be readily applied to the closing band for umbrellas, parasols, etc., or to a strap attached to some other article such as a cane.

The invention has for another object the provision of identification means of the character stated which may be readily incorporated in the closing band or strap and which will provide a pocket for carrying a name plate or the like which may be readily read through one transparent side of the pocket.

The invention has for a further object the provision of identification means of the character stated which will be of extremely simple construction, inexpensive and highly efficient for the purpose for which it is intended, thereby considerably reducing the liability of the loss of the article.

With the foregoing and other objects in view as will appear as the description proceeds, the invention consists in the novel construction, combination and arrangement of cooperating elements as hereinafter more specifically set forth, claimed and shown in the accompanying drawings forming a part of the present application and in which:—

Figure 1:
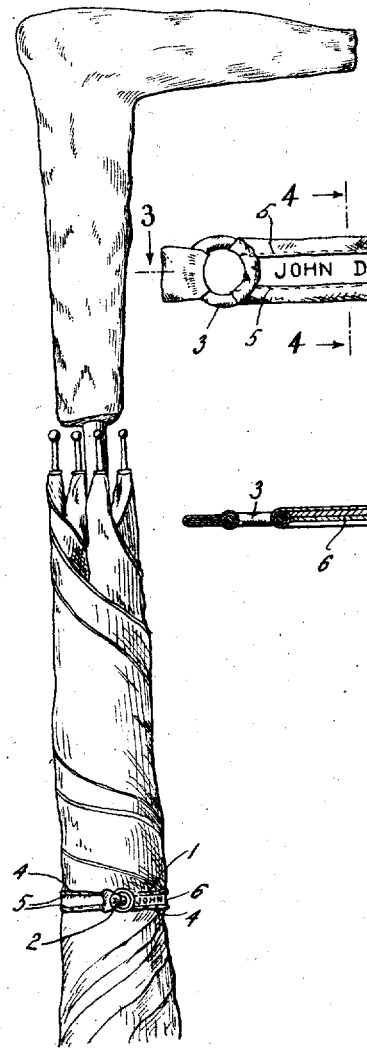
Figure 1 is an elevation of the closing band with my invention applied thereto, a portion of an umbrella being shown to illustrate the application of the invention.
Figure 2:
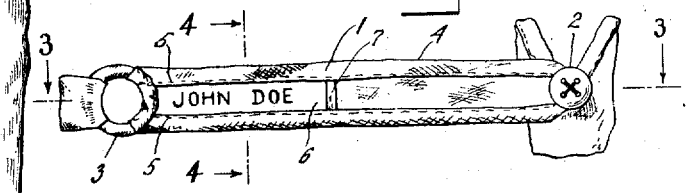
Figure 2 is a detail view of the closing band removed, looking at the inner face thereof.
Figure 3:
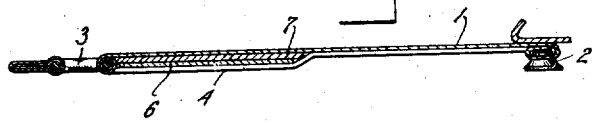
Figure 3 is a longitudinal section on the plane of line 3—3 of Figure 2.
Figure 4:
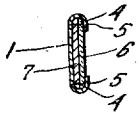
Figure 4 is a transverse section on the plane of line 4—4 of Fig. 2.

Referring more in detail to the drawings in which similar reference characters designate corresponding parts throughout the several views, 1 designates in general the closing band or strap, such as employed on umbrellas, parasols and the like and which is secured thereto by one end, as shown at 2, a ring 3 being mounted in the usual manner on the outer or free end of the closing band 1, as shown clearly in the drawings. The closing band or strap 1 may be composed of cloth or any other suitable material and is illustrated as being composed of a single thickness with the longitudinal edges turned back and secured to the main portion of the band or strap by rows of stitching or the like, as shown at 5, the turned back edges being designated by the numeral 4. Positioned on the main portion of the band or strap 1 and engaging the inner face thereof, at a point adjacent the outer end of the strap upon which the ring 3 is mounted is a transparent plate of mica, or other suitable material, the longitudinal edges of the plate 6 being secured between the turned back edges 4 of the band or strap 1 and the main portion thereof, as clearly shown in Figure 4 of the drawings.

It will be readily seen that by securing the plate 6 in position, as just described, a pocket is formed within which may be removably positioned a name plate or identification card 7 having thereon the owner's name or any other information desired, so that any party obtaining possession of the article to which the band or strap 1 is attached may readily identify the owner and return the article. It will also be understood that owing to the ring 3 being secured upon the free end of the band or strap 1, only the opposite end of the pocket is open for insertion or removal of the plate or identification card 7. This will reduce to the minimum liability of loss of the plate or identification card 7.

While the preferred embodiment of the invention has been shown and described, it will be understood that minor changes in the details of construction and arrangement of parts may be resorted to within the scope of what is claimed without departing from the spirit of the invention.

What is claimed is:—

1. An identification device consisting of a flexible band, separable fastening members for said band disposed one adjacent each end thereof, said band having returned side portions, a transparent plate, longitudinal securing means passing through said band, portions and plate, and an identification card insertible beneath said plate to abut one of said members at one end and to engage said securing means at its longitudinal edges.

2. An identification device comprising a flexible band, separable fastening members for said band disposed one adjacent each end thereof, a transparent member secured to said band to form one face of a pocket, the opposite portion of the band forming the opposite face of the pocket, and an identification member removably held in said pocket.

3. An identification device comprising a flexible band, separable fastening members for said band disposed one adjacent each end thereof, said band having returned side portions, a transparent plate, longitudinal securing means passing through said band, side portions and plate, and an identification card insertible beneath said plate.

4. The combination with an umbrella, of a closing band therefor including a flexible band attached thereto at one end, separable fastening members for said flexible band disposed one adjacent each end thereof, a transparent member secured to said band to form one face of a pocket, the opposite portion of the band forming the opposite face of the pocket, and an identification member removably held in said pocket.

5. The combination with an umbrella, of a closing band therefor including a flexible band attached thereto at one end, said band having returned side portions separable fastening members for said flexible band disposed one adjacent each end thereof, a transparent plate, longitudinal securing means passing through said band, side portions and plate, and an identification card insertible beneath said plate.

Signed at New York, in the county of New York and State of New York, this 15th day of March, 1923.

DANIEL HIRSCH.